Patented Sept. 19, 1944

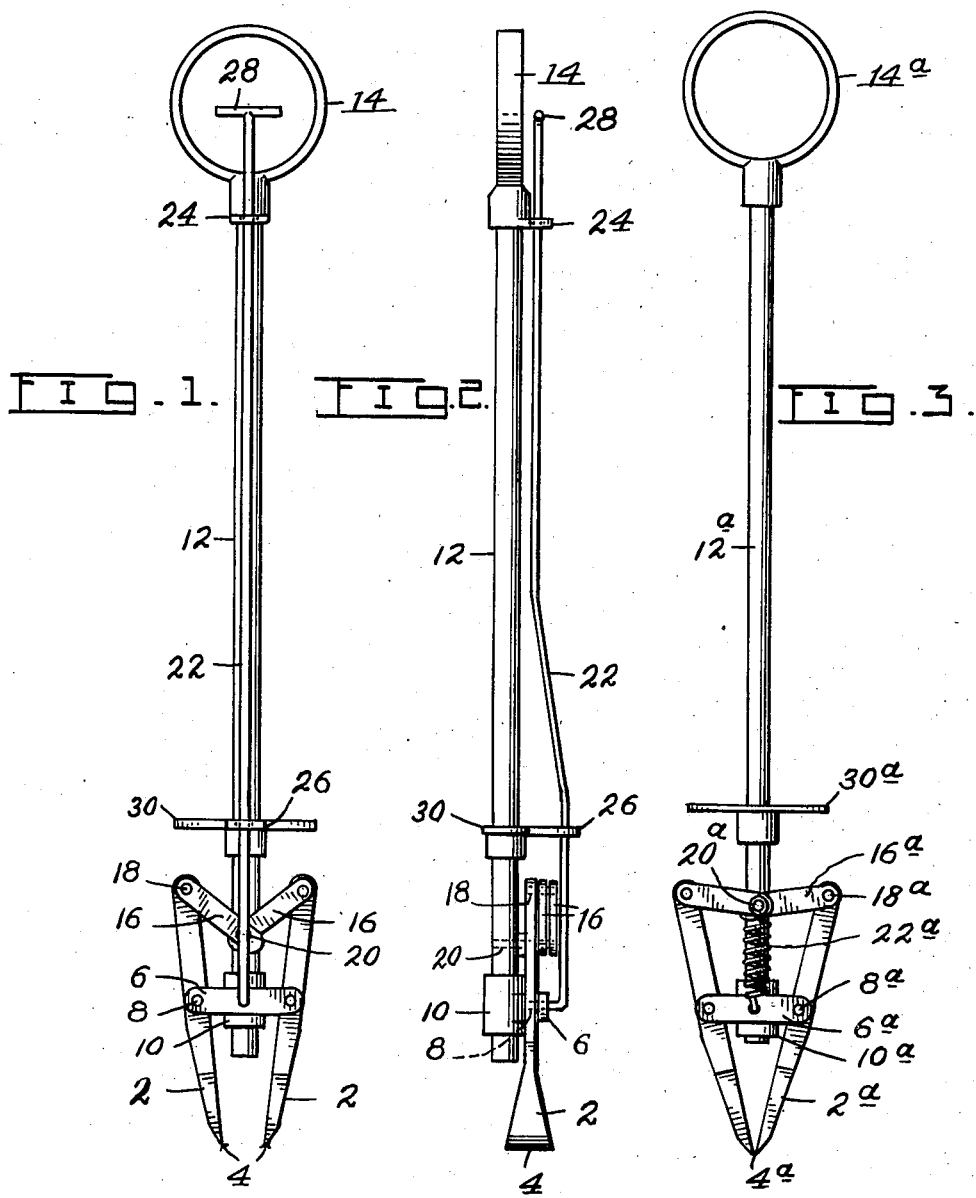

2,358,632

UNITED STATES PATENT OFFICE 2,358,632

WEED PULLER

August H. Gerken, Kansas City, Mo.

Application November 3, 1943, Serial No. 509,003

8 Claims. (Cl. 294—50.8)

My invention relates to a plant pulling device and one object of the invention is to provide a device of this character whereby weeds and other noxious plants, together with their roots, may be extracted from the soil and completely eradicated.

A further object is to provide a plant pulling device having a handle bar which enables the user to stand in an upright position when operating the device.

Another object is to provide a plant pulling device with a pair of movable jaws and operating means therefor whereby the gripping action of said jaws is increased in proportion to the pull on the plant when extracting the latter from the soil.

A further object is to provide a simple and inexpensive device of this character which is well adapted for the purpose intended and not liable to get out of order.

Other objects will hereinafter appear and in order that the invention may be fully understood, reference will now be had to the accompanying drawing in which:

Fig. 1 is a front elevation of a preferred form of the device with the jaws thereof in open position.

Fig. 2 is a side elevation of the device.

Fig. 3 is a front elevation of a modified form with the jaws in closed position.

In carrying out the invention I provide a pair of jaws 2 having sharp lower edges 4 so that they may be readily pushed downward into the soil at opposite sides of a plant root, preparatory to extracting the same from the soil.

The jaws 2 are operably connected intermediate their upper and lower ends, preferably about midway between their ends, to the opposite ends of a transverse member 6. Pivots 8 placed through apertures in the jaws and the transverse member, are preferably employed for connecting the jaws to said transverse member. A vertically disposed sleeve 10 is fixed to the transverse member 6 intermediate the ends of the latter to slidably receive the lower portion of a handle bar 12 provided at its upper end with a handle 14, preferably in the form of a ring or the equivalent thereof.

The upper ends of the jaws 2 are operably connected to the handle bar 12 at a point above the sleeve 10, by means of a pair of links 16, preferably of equal lengths, to obtain a powerful toggle-like action for causing the lower portions of the jaws to firmly grip the roots of a plant. Preferably, the links 16 are connected at their outer ends to the upper ends of the jaws 2 by pivots 18 and have their inner ends crossed and connected to the handle bar by a pivot 20. The pivots 18 and 20 extend through apertures in the jaws and the links, respectively.

A rod 22 is suitably connected at its lower end to the intermediate portion of the transversee member 6 and extends upward alongside of the handle bar 12, which latter is provided with upper and lower guide members 24 and 26, respectively, having apertures through which the rod 22 freely extends. The upper end of the rod 22 is provided with a handle 28 arranged adjacent to the handle 14, so that both handles may be grasped by the operator with one hand. The lower guide member 26 is provided with a horizontal foot piece 30 to which pressure may be applied with either foot of the operator to force the blades 2 into the soil.

In practice the operator grasps the handles 12 and 28, respectively, and exerts downward pressure upon the handle 14 and an upward pull on the handle 28 to hold the jaws 2 in open position. The jaws are then placed at opposite sides of a plant to be extracted and pushed downward into the soil adjacent to the root or roots of the plant. The handle 28 of the rod 22 is then released and an upward pull is exerted on the handle 14 to lift the handle bar 12. As the handle bar 12 moves upward in the sleeve 10, the crossed ends of the links 16 move upward therewith and cause their outer ends to force the upper ends of the jaws to move outward until their lower ends firmly grip the root or roots of the plant, which latter is then extracted by pulling the device upward by the handle 14. By arranging the jaws 2 and their actuating means as shown and described it will be readily understood that the gripping action of the jaws is increased in proportion to the pull on the plant during the operation of extracting the latter from the soil.

The construction of the modified form disclosed by Fig. 3, is substantially the same as the preferred form, as is evidenced by similar reference numerals with exponents a, the main difference residing in a retractile spring 22a which is substituted for the rod 22.

From the foregoing description taken in connection with the drawing, it is apparent that I have provided a plant pulling device possessing the advantages above pointed out, and while I have shown two forms of the device I reserve all rights to such other forms and modifications thereof as properly fall within the scope of the invention as claimed.

Having thus described my invention, what I claim and desire to secure by Letters Patent, is:

1. In a plant pulling device, a pair of movable jaws, a transverse member operably connected at its ends to intermediate portions of the jaws, a handle bar extending downward adjacent to the jaws and movable up or down with relation to said transverse member, guide means fixed to the intermediate portion of the transverse member for guiding the lower part of the handle bar, and means operably connecting the handle bar to the upper portions of the respective jaws whereby the lower ends of the jaws are simultaneously forced towards each other when the handle bar is pulled upwardly.

2. In a plant pulling device, a pair of movable jaws having sharp lower ends, a transverse member operably connected at its ends to intermediate portions of the jaws, a handle bar extending downward adjacent to the jaws and movable up or down with relation to said transverse member, tubular means fixed to the intermediate portion of the transverse member for guiding the lower part of the handle bar, and means operably connecting the handle bar to the upper portions of the respective jaws whereby the lower ends of the jaws are simultaneously forced towards each other when the handle bar is pulled upwardly.

3. In a plant pulling device, a pair of movable jaws, a transverse member pivotally connected at its ends to intermediate portions of the jaws, a handle bar extending downward adjacent to the jaws and movable up or down with relation to said transverse member, guide means fixed to the intermediate portion of the transverse member for guiding the lower part of the handle bar, and pivotal means operably connecting the handle bar to the upper portions of the respective jaws whereby the lower ends of the jaws are simultaneously forced towards each other when the handle bar is pulley upwardly.

4. In a plant pulling device, a pair of movable jaws, a transverse member operably connected at its ends to intermediate portions of the jaws, a handle bar extending downward adjacent to the jaws and movable up or down with relation to said transverse member, guide means fixed to the intermediate portion of the transverse member for guiding the lower part of the handle bar, and a pair of links operably connecting the upper ends of the respective jaws to the handle bar whereby the lower portions of the jaws are simultaneously forced towards each other when the handle bar is pulled upwardly.

5. In a plant pulling device, a pair of movable jaws, a transverse member operably connected at its ends to intermediate portions of the jaws, a rod extending upwardly from the transverse member, a handle bar extending downward adjacent to the jaws and movable up or down with relation to said transverse member and the rod, guide means fixed to the intermediate portion of the transverse member for guiding the lower part of the handle bar, and means operably connecting the handle bar to the upper portions of the respective jaws whereby the lower ends of the jaws are simultaneously forced towards each other when the handle bar is pulled upwardly.

6. In a plant pulling device, a pair of movable jaws, a transverse member operably connected at its ends to intermediate portions of the jaws, a rod extending upwardly from the transverse member, a handle bar extending downward adjacent to the jaws and movable up or down with relation to said transverse member and the rod, means on the handle bar for supporting the rod alongside of the handle bar, guide means fixed to the intermediate portion of the transverse member for guiding the lower part of the handle bar, and means operably connecting the handle bar to the upper portions of the respective jaws whereby the lower ends of the jaws are simultaneously forced towards each other when the handle bar is pulled upwardly.

7. In a plant pulling device, a pair of movable jaws, a transverse member operably connected at its ends to intermediate portions of the jaws, a handle bar extending downward adjacent to the jaws and movable up or down with relation to said transverse member, a foot-piece secured to the lower portion of the handle bar, guide means fixed to the intermediate portion of the transverse member for guiding the lower part of the handle bar, and means operably connecting the handle bar to the upper portions of the respective jaws whereby the lower ends of the jaws are simultaneously forced towards each other when the handle bar is pulled upwardly.

8. In a plant pulling device, a pair of movable jaws, a transverse member operably connected at its ends to intermediate portions of the jaws, a rod extending upwardly from said transverse member, a handle fixed to the upper end of said rod, a handle bar extending downward adjacent to the jaws and movable up or down with relation to said transverse member, a handle fixed upon the upper end of the handle bar and arranged adjacent to the handle on the rod, guide means fixed to the intermediate portion of the transverse member for guiding the lower part of the handle bar, and means operably connecting the handle bar to the upper portions of the respective jaws whereby the lower ends of the jaws are simultaneously forced towards each other when the handle bar is pulled upwardly.

AUGUST H. GERKEN.